United States Patent [19]
Fukushima

[11] Patent Number: 5,402,509
[45] Date of Patent: Mar. 28, 1995

[54] OPTICAL FIBER COUPLING DEVICE INCLUDING LENSES AND MAGNETOOPTICS

[75] Inventor: Nobuhiro Fukushima, Kawasaki, Japan

[73] Assignee: Fujitsu Limited, Kawasaki, Japan

[21] Appl. No.: 50,143

[22] PCT Filed: Sep. 4, 1992

[86] PCT No.: PCT/JP92/01138
§ 371 Date: May 3, 1993
§ 102(e) Date: May 3, 1993

[87] PCT Pub. No.: WO93/05429
PCT Pub. Date: Mar. 18, 1993

[30] Foreign Application Priority Data

Sep. 12, 1991 [JP] Japan .................. 3-232652

[51] Int. Cl.⁶ .............................. G02B 6/32; G02F 1/09
[52] U.S. Cl. .......................... 385/33; 385/6; 385/11; 385/36; 385/31; 359/280; 359/281; 359/282; 359/283
[58] Field of Search ............ 385/6, 8, 11, 14, 28, 385/29, 33, 34, 36, 88, 89, 129, 130, 147; 359/280, 281, 282, 283; 372/6

[56] References Cited

U.S. PATENT DOCUMENTS

| | | | |
|---|---|---|---|
| 4,239,329 | 12/1980 | Matsumoto | 385/11 X |
| 4,548,478 | 10/1985 | Shirasaki | 359/281 X |
| 4,604,577 | 8/1986 | Matsumura et al. | 359/282 X |
| 4,712,880 | 12/1987 | Shirasaki | 359/281 X |
| 4,756,607 | 7/1988 | Watanabe et al. | 359/282 X |
| 4,893,890 | 1/1990 | Lutes | 385/33 X |
| 5,066,092 | 11/1991 | Droegemueller et al. | 385/33 |
| 5,204,771 | 4/1993 | Koga | 359/281 |
| 5,237,445 | 8/1993 | Kuzuta | 359/281 |

FOREIGN PATENT DOCUMENTS

| | | | |
|---|---|---|---|
| 57-100410 | 6/1982 | Japan | 385/11 X |
| 60-154227 | 8/1985 | Japan | 385/11 X |
| 61-45219 | 3/1986 | Japan | 385/11 X |
| 61-122624 | 6/1986 | Japan | 385/11 X |
| 63-20119 | 2/1988 | Japan | 385/11 X |
| 63-239426 | 10/1988 | Japan | 385/11 X |
| 3-185419 | 8/1991 | Japan | 385/11 X |
| 3-206426 | 9/1991 | Japan | 385/11 X |

*Primary Examiner*—Brian Healy
*Attorney, Agent, or Firm*—Staas & Halsey

[57] ABSTRACT

An optical device which optically connects a first and a second optical fiber with an optical path provided therebetween and has two or more functions including the function of an optical isolator. A beam of parallel rays obtained by having a beam from an excitation end of a first optical fiber collimated by a lens is passed through a double refraction element, a magnetooptic element, and a double refraction element in order of mention and converged by a lens to be introduced to a second optical fiber through its excitation end, while a beam from the second optical fiber is not coupled to the first optical fiber. Meanwhile, a beam from an excitation port is coupled to the first optical fiber. The optical device is suitable for use in an optical amplification system and a two-way optical transmission system.

9 Claims, 7 Drawing Sheets

OPTICAL FIBER COUPLING DEVICE INCLUDING LENSES AND MAGNETOOPTICS

BACKGROUND OF THE INVENTION

1. Field of the Invention

The present invention generally relates to an optical device for optically connecting a pair of optical fibers (a first and a second optical fiber) and, more particularly, relates to an optical device having two or more functions including the function of an optical isolator and suitable for use in such an optical system as an optical amplification system and a two-way optical transmission system.

2. Description of the Related Art

As references disclosing optical devices for connecting a first optical fiber with a second optical fiber, specifications of U.S. Pat. No. 4,548,478 and Japanese Patent Publication No. 61-58809 are known. The optical devices disclosed in such specifications have the function of an optical isolator, of which the forward transmittance is not dependent on the polarization state of the input light beam (polarization-independent isolator). The polarization-independent optical isolator in principle couples all of the light rays output from a first optical fiber to a second optical fiber and couples none of the light rays output from the second optical fiber to the first optical fiber. Hereinafter, the polarization-independent isolator will be briefly referred to as "optical isolator".

The optical isolator of the described type has many uses. For example, in an optical amplification system provided with an optical amplification medium of the optical pumping type, there is used an optical isolator to prevent formation of an optical resonator structure including the optical amplification medium in the resonating optical path. As a practicable optical amplification system including an optical amplification medium of the optical pumping type, there is known an optical fiber amplifier including, as the optical amplification medium, an optical fiber (doped fiber) at least the core of which is doped with a rare earth element such as Er, Nd, and Yb.

In the optical fiber amplifier, signal light and pumping light are introduced into the doped fiber and the signal light is directly amplified on the principle of stimulated emission at the wavelength of the signal light. Therefore, in order to construct an optical fiber amplifier, a multiplexer for introducing the signal light and the pumping light supplied through separate routes into a single doped fiber and other peripheral parts become indispensable. If an optical device having functions of two or more of such peripheral parts is realized, it will be very useful in simplifying the structure of an optical amplification system or the like.

Accordingly, an object of the present invention is to provide an optical device being simple in structure and having two or more functions including the function of an optical isolator.

SUMMARY OF THE INVENTION

According to the present invention, there is provided an optical device for optically connecting a first optical fiber and a second optical fiber with an optical path provided between the first and second optical fibers, which comprises a first and a second lens disposed in the optical path for collimating light beams emitted from excitation ends of the first and second optical fibers, respectively, into a beam of virtually parallel rays, a first and a second double refraction element disposed between the first and second lenses, each thereof having an optical axis in a predetermined relationship with the optical path, a first magnetooptic element disposed between the first and second double refraction elements for rotating the plane of polarization of transmitted light therethrough by an angle of 45°, and an excitation port disposed in a predetermined position in the vicinity of the excitation end of the second optical fiber for emitting at least a linearly polarized light beam corresponding to either of the ordinary ray and the extraordinary ray in the second double refraction element, and in which a beam of parallel rays obtained by having a light beam from the excitation end of the first optical fiber collimated by the first lens is passed through the first double refraction element, the first magnetooptic element, and the second double refraction element in order of mention, and, when the beam is converged by the second lens to form a focus, the focus is positioned inside the core of the second optical fiber at its excitation end, a beam of parallel rays obtained by having a light beam from the excitation end of the second optical fiber collimated by the second lens is passed through the second double refraction element, the first magnetooptic element, and the first double refraction element in order of mention, and, when the beam is converged by the first lens to form a focus, the focus is positioned outside the core of the first optical fiber at its excitation end, and a beam of parallel rays obtained by having a light beam from the excitation port collimated is passed through the second double refraction element, the first magnetooptic element, and the first double refraction element in order of mention, and, when the beam is converged by the first lens to form a focus, the focus is positioned inside the core of the first optical fiber at its excitation end.

DETAILED DESCRIPTION OF THE PREFERRED EMBODIMENTS

An embodiment of the present invention will be described below in detail with reference to the accompanying drawings. Throughout the drawings, substantially identical parts are denoted by the same reference numerals.

Figure 1:
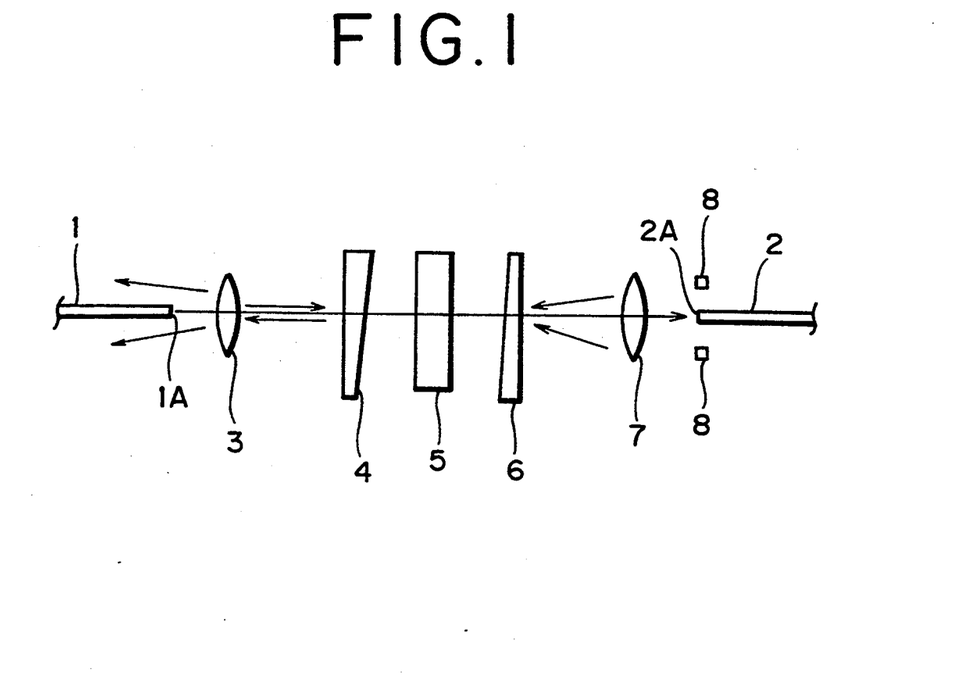
FIG. 1 is a diagram showing a basic structure of an optical device according to the present invention.

FIG. 1 is a diagram showing a basic structure of the optical device according to the present invention. The optical device optically connects an optical fiber 1 and an optical fiber 2, having one ends thereof substantially aligned with a common axis, with an optical path provided therebetween. Between the optical fibers 1 and 2, there are disposed a lens 3, a double refraction element 4, a magnetooptic element 5, a double refraction element 6, and a lens 7 in order of mention. In addition, in the vicinity of the excitation end 2A of the optical fiber 2, there is provided an excitation port 8 for emitting a linearly polarized light beam corresponding at least to either of the ordinary ray and the extraordinary ray in the double refraction element 6. There may be provided only one excitation port 8 on one side of the optical fiber 2 or two excitation ports on both sides of the optical fiber 2 as shown in FIG. 1.

The lenses 3 and 7 are disposed in such positions that they can collimate light beams emitted from the excitation ends 1A and 2A of the optical fibers 1 and 2, respectively, into a beam of virtually parallel rays. The double refraction elements 4 and 6 are made of a double refraction material such as rutile and calcite and these are shaped into a flat plate form or a wedge plate form. The magnetooptic element 5 includes a magnetooptic crystal such as a YIG (yttrium-iron garnet) crystal and a means applying a magnetic field in a predetermined direction to the magnetooptic crystal, and the thickness of the magnetooptic crystal and the strength of the magnetic field applied thereto are set up so that the angle of rotation (angle of Faraday rotation) of the plane of polarization of a light beam passing through the magnetooptic crystal becomes 45°. More generally, the angle of Faraday rotation may be $(45+180n)°$ where n is zero or a natural number.

In the arrangement shown in FIG. 1, it is arranged, when a light beam emitted from the excitation end 1A of the optical fiber 1 is collimated by the lens 3 into a beam of parallel rays, and the parallel rays are passed through the double refraction element 4, the magnetooptic element 5, and the double refraction element 6 in order of mention and focused by the lens 7, such that the focus is formed inside the core of the optical fiber 2 at its excitation end 2A. On the other hand, when a light beam emitted from the excitation end 2A of the optical fiber 2 is collimated by the lens 7 into a beam of parallel rays, and the parallel rays are passed through the double refraction element 6, the magnetooptic element 5, and the double refraction element 4 in order of mention and focused by the lens 3, it is arranged such that the focus is formed outside the core of the optical fiber 1 at its excitation end 1A. Accordingly, the arrangement shown in FIG. 1 is equivalent to that in which the fibers 1 and 2 are connected with an optical isolator.

Further, it is arranged, when a light beam emitted from the excitation port 8 is collimated by the lens 7 or another lens, not shown, into a beam of parallel rays, and the parallel rays are passed through the double refraction element 6, the magnetooptic element 5, and the double refraction element 4 in order of mention and focused by the lens 3, such that the focus is formed inside the core of the optical fiber 1 at its excitation end 1A. Therefore, according to the arrangement of FIG. 1, the light beam from the excitation port 8 can be coupled to the optical fiber 1.

Figure 2:
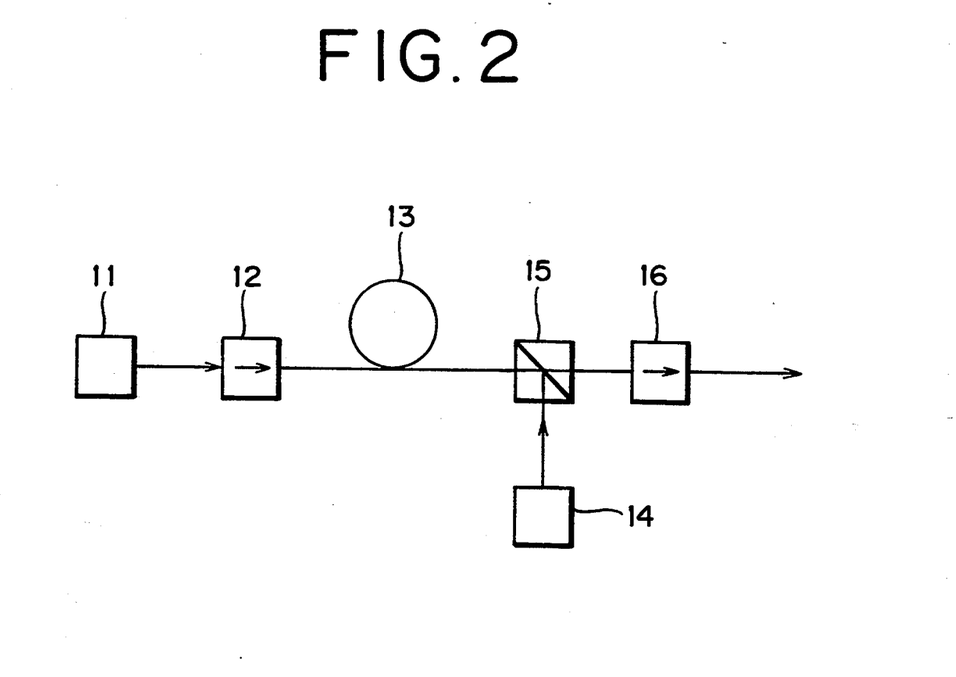
FIG. 2 is a diagram showing an example of an optical fiber amplifier (prior art) to which the present invention is applicable.

FIG. 2 is a diagram showing an example of an optical fiber amplifier of a post-pumping type (that in which the signal light and the pumping light propagate opposite to each other) to which the optical device of the present invention is applicable. Signal light output from a signal light source 11 is passed through an optical isolator 12 in its forward direction and supplied to a doped fiber 13 from its first end. Meanwhile, pumping light output from a pumping light source 14 is supplied through an optical multiplexer 15 to the doped fiber 13 from its second end. The signal light amplified within the doped fiber 13 is passed through the optical multiplexer 15 and an optical isolator 16 in order of mention to be transmitted on an optical transmission line for signal light transmission, not shown. The optical multiplexer 15 is formed for example of a dielectric multilayer film allowing the signal light to transmit therethrough and the pumping light to reflect therefrom according to the difference in wavelength between the signal light and the pumping light. A three-terminal type optical circulator can also be used as the optical multiplexer 15.

When applying the optical device of FIG. 1 to the optical fiber amplifier of FIG. 2, the excitation end of the optical fiber 1 in FIG. 1 on the other side of the excitation end 1A is connected with the second end of the doped fiber 13 in FIG. 2, the excitation end of the optical fiber 2 in FIG. 1 on the other side of the excitation end 2A is connected with the optical transmission line for signal light transmission, and the pumping light is arranged to be output from the excitation port 8 in FIG. 1. In order to have the pumping light output from the excitation port 8, the pumping light source 14 in FIG. 2 is put in the position of the excitation port 8 in FIG. 1 or the pumping light source 14 is connected with the first excitation end of a polarization maintaining fiber (constant polarization fiber) and the second excitation end of the polarization maintaining fiber is put in the position of the excitation port 8 in FIG. 1.

According to the application of the device as described above, an optical fiber amplifier simple in configuration and suitable for miniaturization can be provided by using a single optical device having functions of both the optical multiplexer 15 and the optical isolator 16 in FIG. 2, or having, in addition thereto, the function of the pumping light source 14.

In an optical fiber amplifier as shown in FIG. 2, when there is a limit to the output power from a single pumping light source 14, it is effective to double the pumping light source for improving the gain in the optical fiber amplifier. Since the light output of a semiconductor laser in general used as the pumping light source is substantially a linearly polarized light beam, it is possible to use a polarization coupler in doubling the pumping light source. More specifically, two pumping light sources 14A and 14B outputting polarized light beams whose planes of polarization are crossing at right angles to each other may be used as shown in FIG. 3 and these pumping light beams may be combined in the polarization coupler 21 to be introduced into the doped fiber 13.

Figure 3:
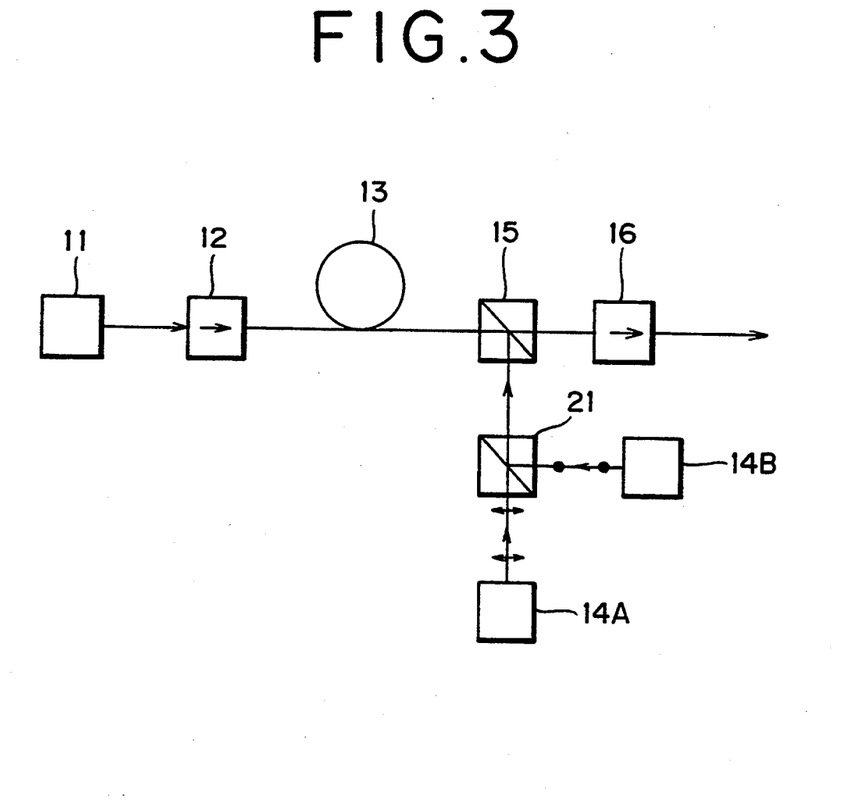
FIG. 3 is a diagram showing another example of an optical fiber amplifier (prior art) to which the present invention is applicable.

In applying the optical device of FIG. 1 to the optical fiber amplifier of FIG. 3, two excitation ports 8 corresponding to the pumping light sources 14A and 14B, respectively, are used. Thus, an optical fiber amplifier simple in configuration and suitable for miniaturization can be provided by using a single optical device having functions of the optical multiplexer 15, the optical isolator 16, and the polarization coupler 21 in FIG. 3, or having, in addition thereto, the functions of the pumping light sources 14A and 14B.

Figure 4:
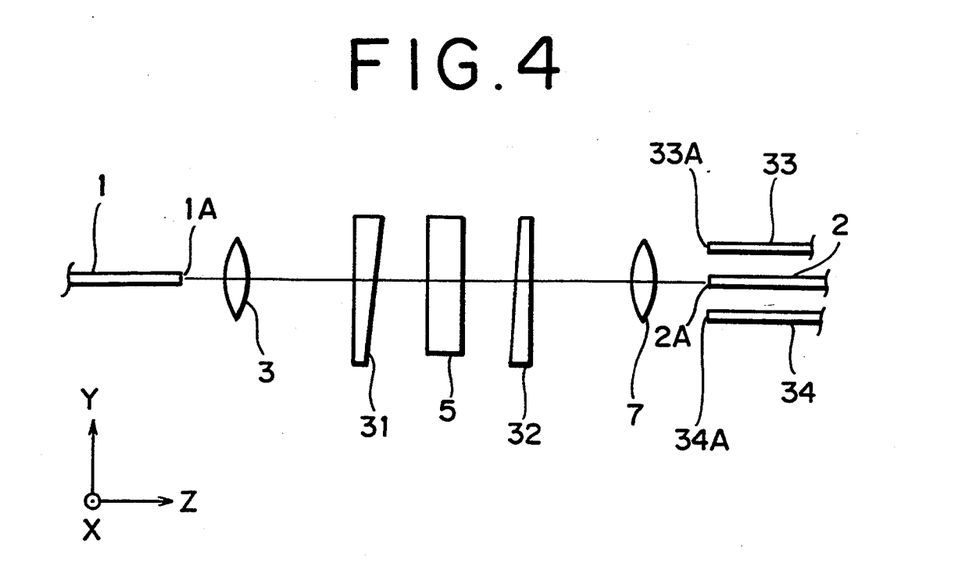
FIG. 4 is a structural diagram of an optical device in a first embodiment of the present invention.

FIG. 4 is a diagram showing a first embodiment as a particular example of the optical device of FIG. 1. As the optical fibers 1 and 2, single mode fibers are suitable. As the double refraction elements 4 and 6 (refer to FIG. 1), wedge plates 31 and 32 made of a double refraction material are used, respectively. On both sides of the optical fiber 2, there are provided polarization maintaining fibers 33 and 34 disposed in parallel with the optical fiber 2 and with each other, of which excitation ends 33A and 34A correspond to the excitation ports 8, 8 in FIG. 1, respectively. Excitation ends, not shown, of the polarization maintaining fibers 33 and 34 on the other side of the excitation ends 33A and 34A are connected with light sources (for example, the pumping light sources 14A and 14B in FIG. 3), respectively.

In the three-dimensional X, Y, and Z coordinate system which is shown in some diagrams including FIG. 4, the positive direction of X axis is the direction crossing the axial direction of the optical fibers at right angles, from left to right when the optical fiber 2 is seen from the side of the optical fiber 1, the positive direction of Y axis is in parallel with the direction from bottom to top of each double refraction element, and the positive direction of Z axis is that going from the optical fiber 1 toward the optical fiber 2.

Figure 5:
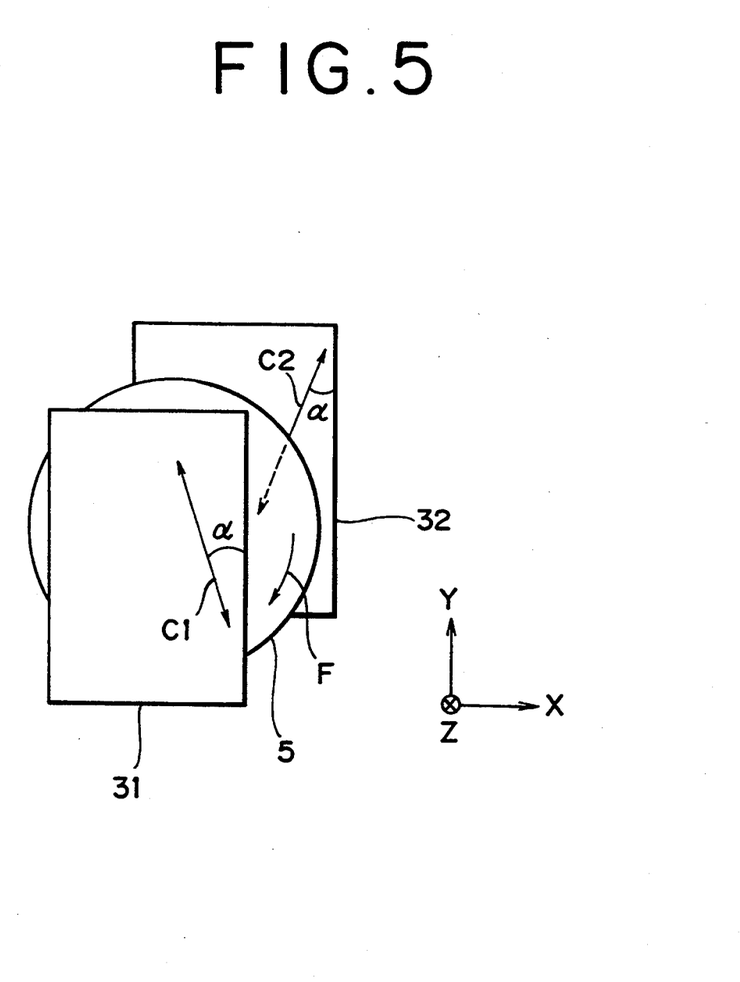
FIG. 5 is a diagram explanatory of the direction of the optical axis and the rotating direction of the plane of polarization in the first embodiment of the invention.

FIG. 5 is a diagram explanatory of optical axes of the wedge plates 31 and 32 and the rotating direction of the plane of polarization in the magnetooptic element 5. We assume that the side faces of the wedge plates 31 and 32 are parallel to the YZ plane. The optical axis C1 of the wedge plate 31 is virtually parallel to the XY plane and the angle $\alpha$ formed between the optical axis C1 and the YZ plane is set to 22.5°. As the wedge plate 32, the one fabricated in the same process as that for fabricating the wedge plate 31 is used. These wedge plates 31 and 32 are arranged, as shown in FIG. 4, such that the top and the bottom of the wedge plate 31 oppose the bottom and the top of the wedge plate 32, respectively, and the corresponding surfaces are parallel to each other. As a result, the angle formed between the optical axis C2 of the wedge plate 32 and the YZ plane also becomes $\alpha$ (=22.5°) and, hence, the optical axis C2 of the wedge plate 32 is in the position to be reached by the optical axis C1 of the wedge plate 31 when it is rotated 45° in a clockwise direction round the Z axis in the case illustrated in FIG. 5. In this case, the rotating angle in the magnetooptic element 5 is set to be the clockwise direction as indicated by character F. Since, as described above, the wedge plates having the optical axis at an angle of 22.5° to its side face can be used for both of the pair of double refraction elements in the present invention, such wedge plates are effective in facilitating the fabrication of the optical device.

Referring to FIG. 4, the principal axes of the polarization maintaining fibers 33 and 34 (the axes on the cross-sectional planes of the fibers corresponding to the planes of polarization of the linearly polarized light beams maintainable by the fibers) are set up such that the light beams supplied from the polarization maintaining fibers 33 and 34 to the wedge plate 32 correspond to the ordinary ray and the extraordinary ray in the wedge plate 32, respectively. Namely, the principal axes of the polarization maintaining fibers 33 and 34 are perpendicular to each other.

Figure 6A:
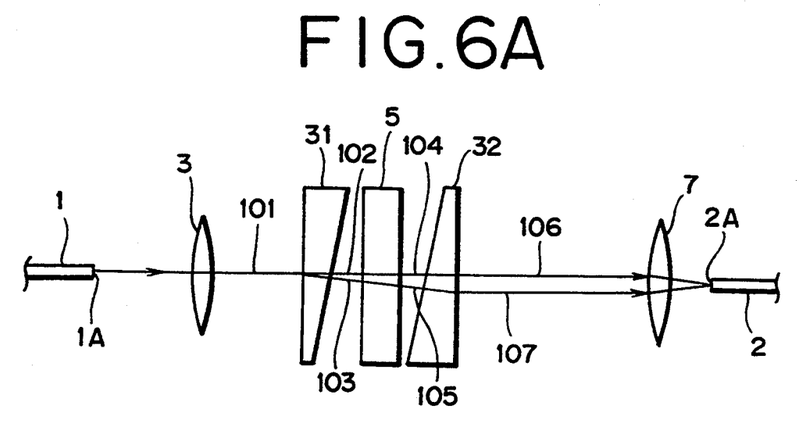
FIG. 6A, FIG. 6B, and FIG. 6C are diagrams explanatory of operations in the optical device in the first embodiment of the invention.
Figure 6B:
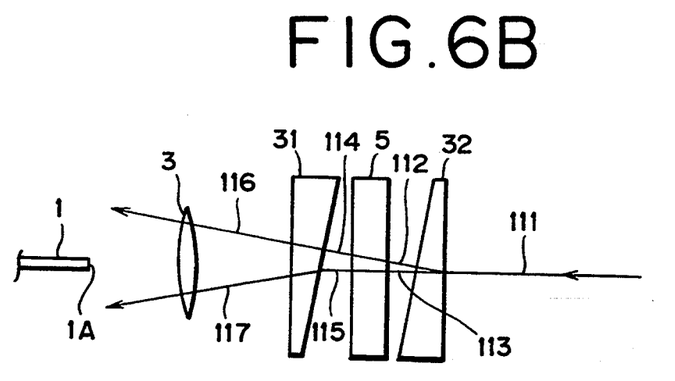
Figure 6C:
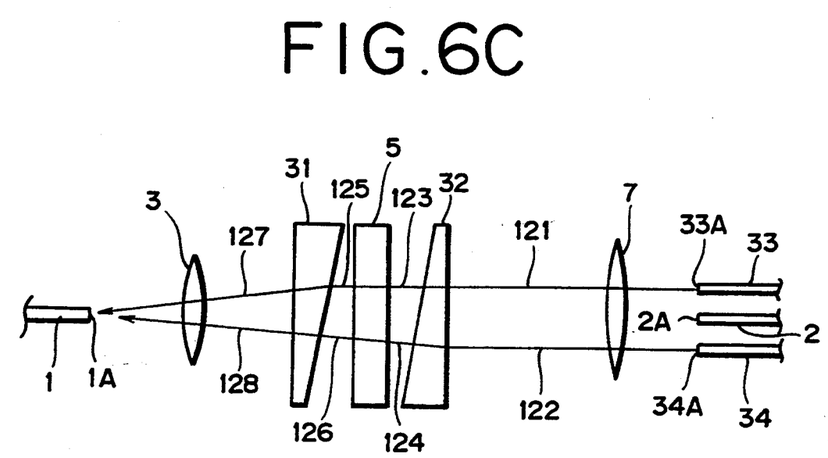

FIG. 6A, FIG. 6B, and FIG. 6C are diagrams explanatory of operations of the optical device in FIG. 4. Referring to FIG. 6A, a light beam emitted from the excitation end 1A of the optical fiber 1 is collimated by the lens 3 into a beam of parallel rays. The collimated beam is denoted by reference numeral 101 with the thickness of the beam neglected. Likewise, each beam will hereinafter be illustrated with the thickness neglected. The beam 101, when passed through the wedge plate 31, is split into a beam 102 whose plane of polarization is perpendicular to the optical axis C1 (refer to FIG. 5) and a beam 103 whose plane of polarization is parallel to the optical axis C1. The beams 102 and 103 correspond to the ordinary ray and the extraordinary ray in the wedge plate 31, respectively. The beams 102 and 103, when passed through the magnetooptic element 5, have their planes of polarization rotated 45° in a clockwise direction with respect to the propagating direction (the direction +Z) and become beams 104 and 105, respectively. Since the plane of polarization of the beam 104 is perpendicular to the optical axis C2 of the wedge plate 32., the beam 104 undergoes refraction as ordinary ray in the wedge plate 32 and becomes a beam 106. Since the plane of polarization of the beam 105 is parallel to the optical axis C2 of the wedge plate 32, the beam 104 undergoes refraction as extraordinary ray in the wedge plate 32 and becomes a beam 107. From the histories of refraction which the beams 106 and 107 have undergone and the state of arrangement of the wedge plates 31 and 32, the beams 106 and 107 become parallel to each other. Therefore, when the beams 106 and 107 are converged by the lens 7, the foci of them can be placed inside the core of the optical fiber 2 at its excitation end 2A and, thus, the beams 106 and 107 can be converged to be introduced into the optical fiber 2.

On the other hand, when light which is not wanted to be propagated in the direction −Z (for example, the light beam reflected and returning from the other end of the optical fiber 2) is emitted from the excitation end 2A of the optical fiber 2, the light beam is collimated by the lens 7 into a beam of parallel rays. The beam is denoted by reference numeral 111 in FIG. 6B. The beam 111, when passed through the wedge plate 32, is split into a beam 112 whose plane of polarization is parallel to the optical axis C2 of the wedge plate 32 and a beam 113 whose plane of polarization is perpendicular to the optical axis C2. The beams 112 and 113 correspond to the extraordinary ray and the ordinary ray in the wedge plate 32, respectively. The beams 112 and 113, when passed through the magnetooptic element 5, have their planes of polarization rotated 45° counterclockwise with respect to the propagating direction (the direction −Z) and become beams 114 and 115, respectively. Since the plane of polarization of the beams 114 is perpendicular to the optical axis C1 of the wedge plate 31, the beam 114 undergoes refraction as ordinary ray in the wedge plate 31 and becomes a beam 116. Since the plane of polarization of the beam 115 is parallel to the optical axis C1 of the wedge plate 31, the beam 115 undergoes refraction as extraordinary ray in the wedge plate 31 and becomes a beam 117. From the histories of refraction which the beams 116 and 117 have undergone and the state of arrangement of the wedge plate 31 and 32, the beams 116 and 117 do not become parallel to each other. Therefore, when the beams 116 and 117 are converged by the lens 3, the foci of them are placed outside the core of the optical fiber 1 and, thus, the beams 116 and 117 cannot be converged to be introduced into the optical fiber 1.

The term "focus" herein has no meaning of a point whose area is infinitely close to zero as used to indicate a position in geometrical optics, but is used to mean a spot of beam having a finite area in a position where the diameter of a beam is minimized when the beam is converged by a lens, or in a position in its vicinity.

In FIG. 6B, the segment connecting the focus of the beam 116 formed by the lens 3 with the focus of the beam 117 formed by the lens 3 is virtually parallel to the Y axis. Accordingly, if the excitation end 2A of the optical fiber 2 and the excitation ports (33A and 34A) are on one Y axis., light beams from the excitation ports can be introduced into the optical fiber 1. More concrete description will be given in the following.

If the distance between the foci of the beams 116 and 117 formed by the lens 3 is represented by Δ, the distance between the excitation ends 33A and 34A of the polarization maintaining fibers 33 and 34 placed parallel to each other is set for example to Δ. The ratio between the divisions of that distance divided by the optical fiber 2 is suitably adjusted. The linearly polarized light beam emitted from the excitation end 33A of the polarization maintaining fiber 33 is collimated by the lens 7 into a beam of parallel rays. This beam is denoted by numeral 121 in FIG. 6C. The linearly polarized light beam emitted from the excitation end 34A of the polarization maintaining fiber 34 is collimated by the lens 7 into a beam of parallel rays. This beam is denoted by numeral 122. The beams 121 and 122 undergo refraction as ordinary ray and extraordinary ray in the wedge plate 32, respectively, and become beams 123 and 124. The beams 123 and 124, when passed through the magnetooptic element 5, are rotated 45° counterclockwise with respect to the propagating direction (the direction −Z) and become beams 125 and 126, respectively. The beams 125 and 126 undergo refraction as extraordinary ray and ordinary ray, respectively, in the wedge plate 31 and become beams 127 and 128. Since the histories of refraction which the beams 127 and 128 have undergone are equal to the histories of refraction which the beams 117 and 116 underwent in FIG. 6B, respectively, and further, since the excitation ends 33A and 34A of the polarization maintaining fibers 33 and 34 are disposed in predetermined positions, the foci formed by converging of the beams 127 and 128 by the lens 3 are placed inside the core of the optical fiber 1 at its excitation end 1A. Thus, by converging the beams 127 and 128 with the lens 3, they can be introduced into the optical fiber 1.

As apparent from the description given above with reference to FIG. 6A and FIG. 6B, the present embodiment provides a function of an optical isolator, of which the transmittance in the forward direction from the optical fiber 1 toward the optical fiber 2 is not dependent on polarization and the extinction effect to the light beam traveling from the optical fiber 2 toward the optical fiber 1 is sufficient. Further, as apparent from the description given above with reference to FIG. 6C, the light beams from the polarization maintaining fibers 33 and/or 34 can be satisfactorily introduced into the optical fiber 1, and hence, the optical device also functions as an optical multiplexer. Furthermore, since the principal axes of the polarization maintaining fibers 33 and 34 are crossing at right angles to each other, it can be achieved to introduce light beams from two independent light sources into the optical fiber 1. Therefore, it is known that the present optical device also functions as a polarization coupler.

In applying the above optical device to an optical fiber amplifier as shown in FIG. 2 or FIG. 3, it should be noted that the wavelength of the amplified signal light output from the optical fiber 1 connected with the doped fiber 13 is generally different from the wavelength of the pumping light output from the polarization maintaining fibers 33A and 34A connected with the pumping light source 14 (14A and 14B). For example, when the wavelength of the signal light is at 1.5 μm band and the element with which the doped fiber is doped is Er (erbium), 0.98 μm band or 1.48 μm band is adopted as the wavelength of the pumping light.

Practically, in the operations of the optical device described above with reference to FIG. 6A, FIG. 6B, and FIG. 6C, there arises no serious problem with the wavelength characteristic of the magnetooptic element 5 due to the fact that the wavelength of the light from the optical fiber 1 coupled with the optical fiber 2 is different from the wavelength of the light from the polarization maintaining fibers 33 and 34 coupled with the optical fiber 1. This is because when signal light of a wavelength of 1.55 μm and pumping light of a wavelength of 1.48 μm are used, for example, the difference therebetween in the angle of Faraday rotation in the magnetooptic element 5 is around 5° and power loss caused thereby is only 0.03 dB or so. The wavelength characteristic as to the angle of Faraday rotation in the magnetooptic element 5 may be adjusted according to the need.

The principle on which the optical coupling is achieved in the optical device functioning as an optical multiplexer described above with reference to FIG. 6C is not based on the difference in wavelength between the light beam from the optical fiber 1 coupled to the optical fiber 2 and the light beams from the polarization maintaining fibers 33 and 34 coupled with the optical fiber 1, but on the difference of the propagating direction of the light beams. Namely, both the light beams are passed through the magnetooptic element 5 because of the necessity for utilizing the non-reciprocality of the magnetooptic element 5. When the magnetooptic element 5 contains YIG, the loss of the light beam due to its passing through the element is 0.1 dB or so and within the tolerance. Rather, it is advantageous in terms of loss because the light beam is not passed through a dielectric multilayer film as in the case with a conventional optical multiplexer.

Figure 7:
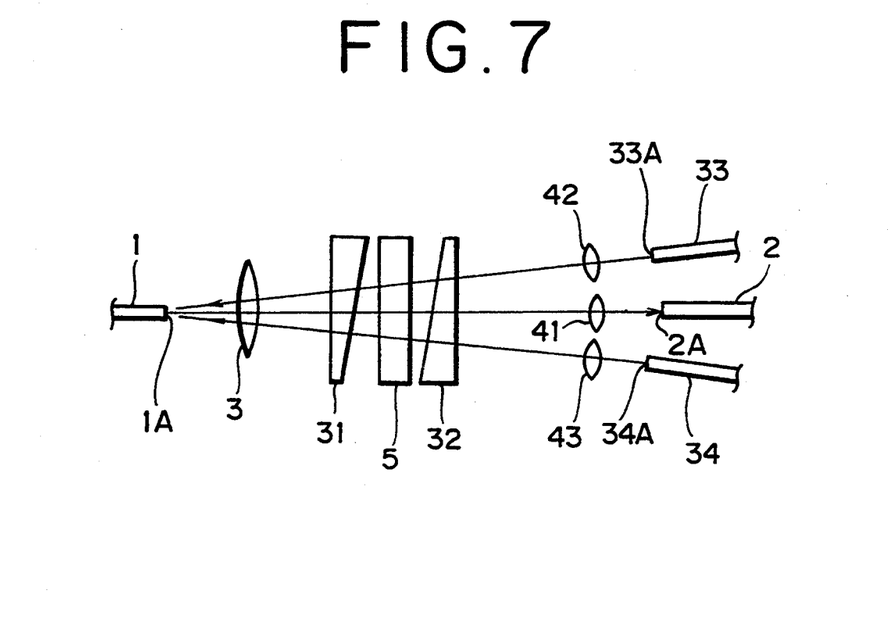
FIG. 7 is a structural diagram of an optical device showing a second embodiment of the invention.

FIG. 7 is a diagram showing a second embodiment as another particular example of the optical device of FIG. 1. This embodiment differs from the first embodiment of FIG. 4 in that the lens 7 is divided into a lens 41, through which the light beam emitted from the optical fiber 1 to couple to the optical fiber 2 is passed, and lenses 42 and 43, through which light beams emitted from the polarization maintaining fibers 33 and 34 to couple to the optical fiber 1, respectively, are passed. According to such a configuration, the margin for misalignment of the polarization maintaining fibers 33 and 34 can be made larger and, hence, adjustments in the fabrication of the optical device can be made easier by using suitable ones as the lenses 42 and 43 and adjusting the distances between the lenses 42 and 43 and the lens 3. In the first embodiment of FIG. 4, since the lens 7 is used in common, the excitation end 2A of the optical fiber 2 and the excitation ends 33A and 34A of the polarization maintaining fibers 33 and 34 have to be positioned close to each other and the optical fiber 2 and the polarization maintaining fibers 33 and 34 are required to be virtually parallel to each other. Therefore, the fabrication work, especially, the alignment of the principal axes of the polarization maintaining fibers 33 and 34, has been difficult. According to the present embodiment, since the excitation end 2A of the optical fiber 2 and the excitation ends 33A and 34A of the polarization maintaining fibers 33 and 34 can be spaced apart to a certain degree and they are not required to be parallel to each other, adjustments in the fabrication become easier.

Figure 8:
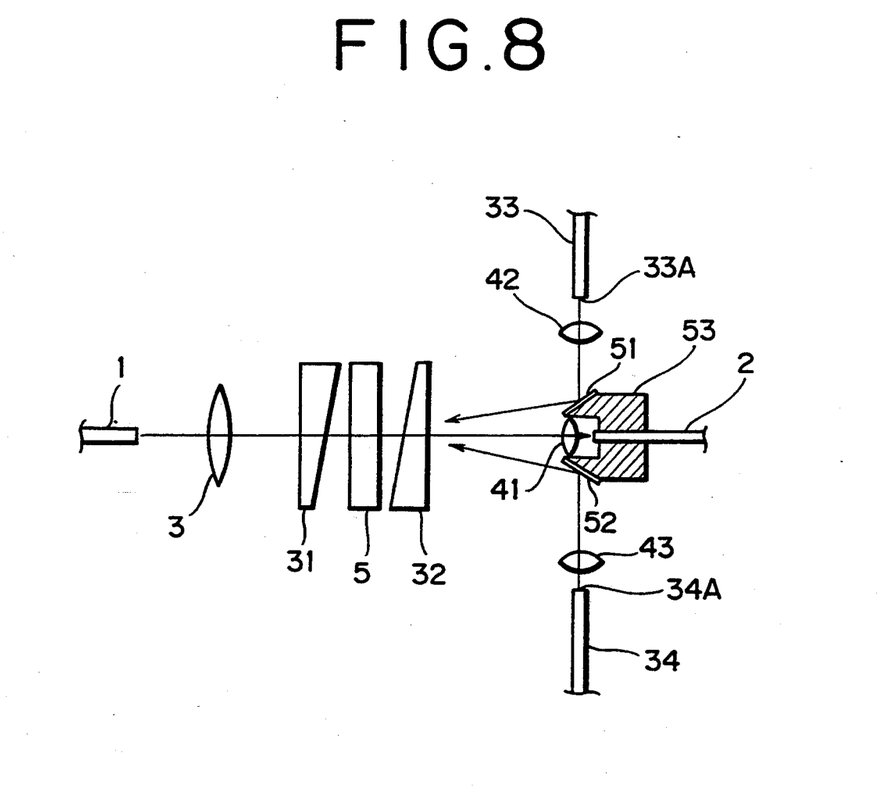
FIG. 8 is a structural diagram of an optical device showing a third embodiment of the invention.

FIG. 8 is a diagram showing a third embodiment as another particular embodiment of the optical device of FIG. 1. This embodiment differs from the second embodiment of FIG. 7 in that light beams emitted from the excitation ends 33A and 34A of the polarization maintaining fibers 33 and 34 and collimated by the lenses 42 and 43 are reflected by mirrors 51 and 52, respectively, to be supplied to the wedge plate 32. The mirrors 51 and 52, together with the lens 41 and the optical fiber 2, are held by a holder 53. According to this embodiment, since the polarization maintaining fibers 33 and 34 can be disposed virtually perpendicularly to the optical fiber 2, a style suitable for the optical device of a three-terminal or a four-terminal type can be provided. Further, because the diameter of each beam is 0.5 mm or so, there is a danger in the case of the second embodiment of FIG. 7 that the lenses 41, 42, and 43 are disposed close to each other and, hence, the holding mechanisms of the respective lenses interfere with each other. In the present embodiment, however, because the lenses 42 and 43 can be disposed apart from the lens 41, the degree of freedom in the designing of the optical device can be made greater.

Figure 9:
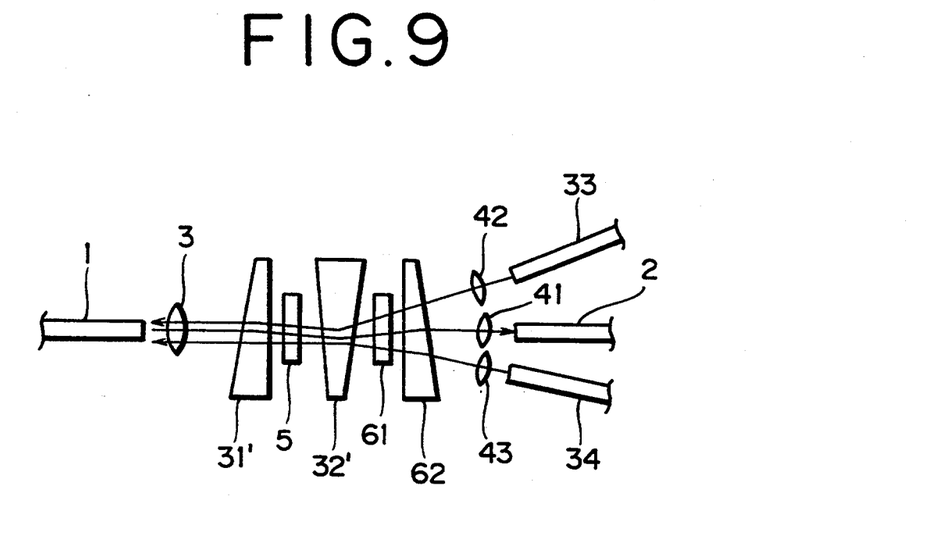
FIG. 9 is a structural diagram of an optical device showing a fourth embodiment of the invention.

FIG. 9 is a diagram showing a fourth embodiment as another particular example of the optical device of FIG. 1. In this embodiment, in order to obtain a certain effect from a connection in cascade of substantially two sets of the wedge plate 31, the magnetooptic element 5, and the wedge plate 32 in the second embodiment of FIG. 7, there are arranged a wedge plate 31', a magnetooptic element 5, a wedge plate 32', a magnetooptic element 61, and a wedge plate 62 in order of mention between the lens 3 and the lenses 41, 42, and 43, in the direction from the optical fiber 1 toward the optical fiber 2 The wedge plates 31', 32', and 62 are arranged such that the top and the bottom of the wedge plate 31' oppose the bottom and the top of the wedge plate 32', respectively, and the top and the bottom of the wedge plate 32' oppose the bottom and the top of the wedge plate 62, respectively. Further, the wedge angle of the wedge plate 32' is set virtually equal to the sum of the wedge angle of the wedge plate 31' and the wedge angle of the wedge plate 62.

Figure 10:
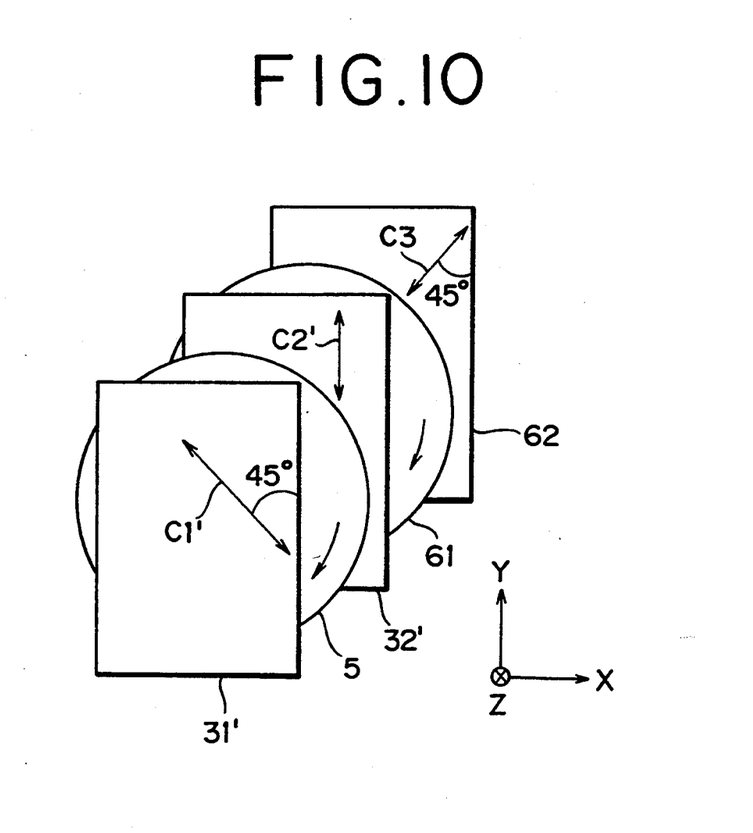
FIG. 10 is a diagram explanatory of the direction of the optical axis and the rotating direction of the plane of polarization in the fourth embodiment of the invention.

FIG. 10 is a diagram explanatory of the optical axes of the wedge plates 31', 32', and 62 and the rotating direction of the plane of polarization in the magnetooptic elements 5 and 61. In the case of this example, the rotating directions of the plane of polarization in the magnetooptic elements 5 and 61 are both clockwise with respect to the direction +Z. The angle of Faraday rotation in the magnetooptic element 61 and that in the magnetooptic element 5 alike are 45°. The optical axis C2' of the wedge plate 32' is in a position to be reached by the optical axis C1' of the wedge plate 31' when it is rotated 45° in a clockwise direction with respect to the direction +Z. The optical axis C3 of the wedge plate 62 is in a position to be reached by the optical axis C2' of the wedge plate 32' when it is rotated 45° clockwise with respect to the direction +Z.

According to this embodiment, since the angle of separation can be made double that in the second embodiment of FIG. 7, the adjusting work becomes simpler. Further, the number of parts becomes smaller than the case where two sets of two wedge plates and one magnetooptic element disposed therebetween are simply connected in cascade.

Figure 11:
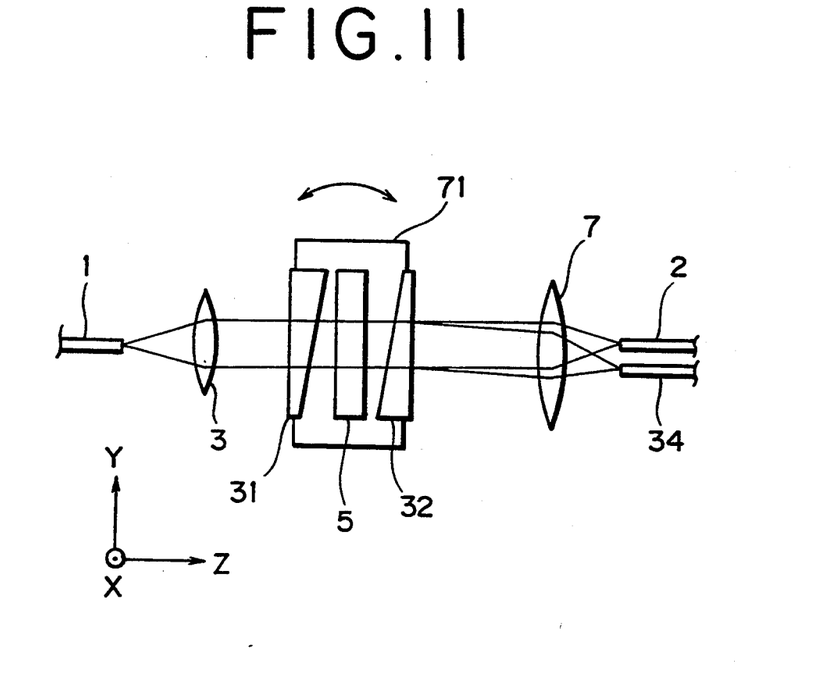
FIG. 11 is a structural diagram of an optical device showing a fifth embodiment of the invention.

FIG. 11 is a diagram showing a fifth embodiment as another particular example of the optical device of FIG. 1. This embodiment is characterized in that the wedge plates 31 and 32 together with the magnetooptic element 5 are fixed on to a table 71 rotatable around an axis which is parallel to the X axis. There is shown in FIG. 11 only the polarization maintaining fiber 34 in the first embodiment of FIG. 4 in the vicinity of the optical fiber 2. When positions of the optical fiber 2 and the polarization maintaining fiber 34 are fixed so that they are parallel to each other and the distance therebetween is a predetermined amount, the optical fiber 2 and the polarization maintaining fiber 34 are generally fixed in parallel V-grooves formed in a substrate. In such case, the distance between the excitation end of the optical fiber 2 and the excitation end of the polarization maintaining fiber 34 is not always highly accurate. On the other hand, when a double refraction material is cut and ground and thereby wedge plates 31 and 32 are formed, the wedge angle is highly accurate.

When the wedge plate 31, the magnetooptic element 5, and the wedge plate 32 are arranged in an assembly as in the present embodiment, the assembly can be considered to be a flat plate whose deflecting angle is zero with respect to the system of a beam of parallel rays emitted from the optical fiber 1 to be coupled to the optical fiber 2. On the other hand, the assembly can be considered to be a prism whose deflecting angle is not zero with respect to the system of a beam of parallel rays emitted from the polarization maintaining fiber 34 to be coupled to the optical fiber 1. Accordingly, when the assembly is rotated a unit angle around an axis in parallel with the X axis, the misalignment in coupling of the light from the optical fiber 1 to the optical fiber 2 will be extremely smaller than the misalignment of the coupling of the light from the polarization maintaining fiber 34 to the optical fiber 1. On the principle just described, even when the relative position of the optical fiber 2 and the polarization maintaining fiber 34 is fixed beforehand, adjustments can be made easily.

Figure 12:
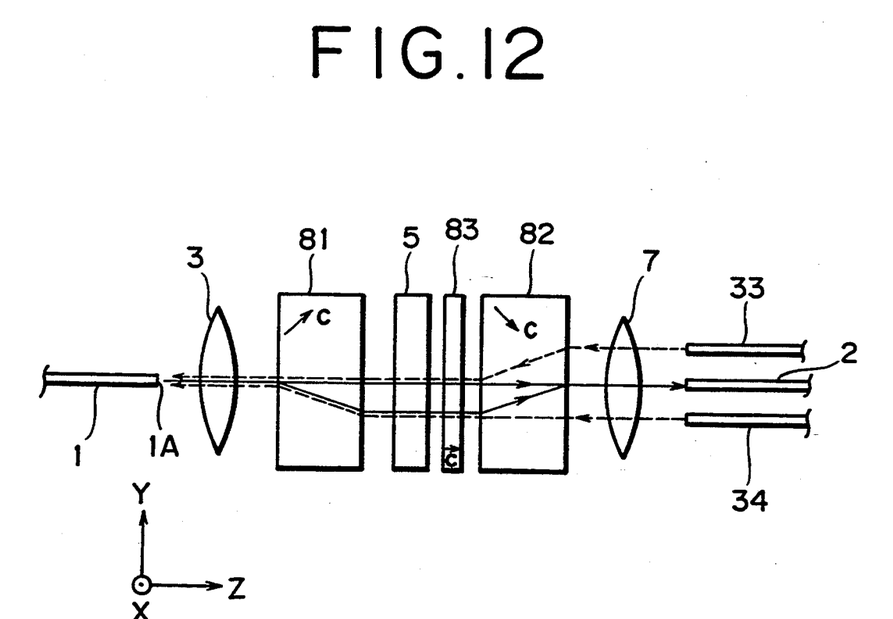
FIG. 12 is a structural diagram of an optical device showing a sixth embodiment of the invention.

FIG. 12 is a diagram showing a sixth embodiment as another particular example of the optical device of FIG. 1. This embodiment differs from the first embodiment of FIG. 4 in that flat plates 81 and 82 made of a double refraction material are used instead of the wedge plates 31 and 32, respectively, and, accordingly, a halfwave plate 83 is interposed between the magnetooptic element 5 and the flat plate 82. The optical axes of the flat plate 81 and 82 are set so that each thereof is at an angle of 45° with the Z axis and these are crossing at right angles. The solid lines indicate a light beam emitted from the optical fiber 1 and coupled to the optical fiber 2, while the broken lines indicate light beams emitted from the polarization maintaining fibers 33 and 34 and coupled to the optical fiber 1. Incidentally, the light beam emitted from the optical fiber 2 and propagated in the direction −Z, not shown, produces a deviation at the excitation end 1A of the optical fiber 1 and does not couple to the optical fiber 1.

When the double refraction elements are provided by wedge plates, selective optical coupling is achieved by angular separation in the wedge plates. However, when the double refraction elements are provided by flat plates, selective optical coupling is achieved by deviation of the beam in a direction perpendicular to the Z axis.

While two polarization maintaining fibers were used in the above described embodiments to provide the optical device with the function of a polarization coupler, the device may be arranged to have only a single polarization maintaining fiber when two light sources are not needed.

Further, instead of a polarization maintaining fiber, a light source constituted of a semiconductor laser (laser diode) or the like may be used as the excitation port itself. When a laser diode is used as the excitation port, it frequently occurs that the light beam emitted from the excitation end of the laser diode has an elliptic cone form. Accordingly, it is desired to use a special lens for collimating the light beam emitted from the laser diode to improve the optical coupling efficiency. Therefore, when laser diodes are used as the excitation ports, it is preferable to provide, as with the second embodiment of FIG. 7, lenses (42, 43) for excitation ports separately from the lens (41) for the principal beam.

The optical device according to the present invention is not only applicable to optical fiber amplifiers as shown in FIG. 2 and FIG. 3 but also applicable to two-way optical transmission systems. When the optical device of FIG. 1 is applied to either of the terminal stations in a two-way optical transmission system, such an arrangement may be made, as an example, that the optical fiber 1 is connected to the optical transmission line of the system, the optical fiber 2 is connected to the optical receiver, and the excitation port 8 is connected to the optical transmitter. According to such an arrangement, incoming signal light transmitted over the optical transmission line of the system is supplied to the optical receiver through the optical fibers 1 and 2, while signal light output from the optical transmitter is transmitted on the optical transmission line through the excitation port 8 and the optical fiber 1. In this case, functions of an isolator and an optical multiplexer are performed by a single optical device used in the terminal station on the one side. If it is arranged such that two optical transmitters are connected to two excitation ports and, when either optical transmitter in use goes out of order, the other optical transmitter is switched on to be used in the system, a highly reliable system can be structured.

Industrial Applicability

As described above, the optical device according to the present invention having two or more functions including the function of an optical isolator is simple in structure and suitable for miniaturization. Therefore, when the optical device is applied to such a system as an optical amplification system and a two-way optical transmission system, the arrangement of apparatuses in the system can be greatly simplified.

I claim:

1. An optical device for optically connecting a first optical fiber and a second optical fiber with an optical path provided between said first and second optical fibers comprising:

a first lens and a second lens disposed in said optical path for collimating light beams emitted from excitation ends of said first and second optical fibers, respectively, into a beam of virtually parallel rays;

a first double refraction element and a second double refraction element, disposed between said first and second lenses, each having an optical axis in a predetermined relationship with said optical path and each including a first and second wedge plate, respectively, made of a double refraction material, the optical axis of said second wedge plate being in a position to be reached by the optical axis of said first wedge plate when said second wedge plate is rotated 45° round said optical path in the same direction as the rotating direction of the plane of polarization in said first magnetooptic element, said first and second wedge plates disposed such that a top and a bottom of said first wedge plate oppose a bottom and a top of said second wedge plate, respective, and their corresponding faces are parallel to each other, and the optical axis of each of said first and second wedge plates is at an angle of 22.5° with the side face of the wedge plate;

a first magnetooptic element disposed between said first and second double refraction elements for rotating the plane of polarization of transmitted light therethrough by an angle of 45°; and an excitation port disposed in a predetermined position in the vicinity of the excitation end of said second optical fiber for emitting at least a linearly polarized light beam corresponding to either of the ordinary ray and the extraordinary ray in said second double refraction element;

a beam of parallel rays obtained by having a light beam from the excitation end of said first optical fiber collimated by said first lens being passed through said first double refraction element, said first magnetooptic element, and said second double refraction element in order of mention, and, when the beam is converged by said second lens to form a focus, the focus is positioned inside the core of said second optical fiber at its excitation end, a beam of parallel rays obtained by having a beam from the excitation end of said second optical fiber collimated by said second lens (7) being passed through said second double refraction element, said first magnetooptic element, and said first double refraction element in order of mention, and, when the beam is converged by said first lens to form a focus, the focus is positioned outside the core of said first optical fiber at its excitation end, and a beam of parallel rays obtained by having a beam from said excitation port collimated being passed through said second double refraction element, said first magnetooptic element, and said first double refraction element in order of mention, and, when the beam is converged by said second lens to form a focus, the focus is positioned inside the core of said first optical fiber at its excitation end.

2. An optical device for optically connecting a first optical fiber and a second optical fiber with an optical path provided between said first and second optical fibers comprising:

a first lens and a second lens disposed in said optical path for collimating light beams emitted from excitation ends of said first and second optical fibers, respectively, into a beam of virtually parallel rays;

a first double refraction element and a second double refraction element, disposed between said first and second lenses, each having an optical axis in a predetermined relationship with said optical path and each including a first and second wedge plate, respectively, made of a double refraction material, the optical axis of said second wedge plate being in a position to be reached by the optical axis of said first wedge plate when said second wedge plate is rotated 45° round said optical path in the same direction as the rotating direction of the plane of polarization in said first magnetooptic element;

a first magnetooptic element disposed between said first and second double refraction elements for rotating the plane of polarization of transmitted light therethrough by an angle of 45°;

an excitation port disposed in a predetermined position in the vicinity of the excitation end of said second optical fiber for emitting at least a linearly polarized light beam corresponding to either of the ordinary ray and the extraordinary ray in said second double refraction element, a beam of parallel rays obtained by having a light beam from the excitation end of said first optical fiber collimated by said first lens being passed through said first double refraction element, said first magnetooptic element, and said second double refraction element in order of mention, and, when the beam is converged by said second lens to form a focus, the focus is positioned inside the core of said second optical fiber at its excitation end, a beam of parallel rays obtained by having a beam from the excitation end of said second optical fiber collimated by said second lens being passed through said second double refraction element, said first magnetooptic element, and said first double refraction element in order of mention, and, when the beam is converged by said first lens to form a focus, the focus is positioned outside the core of said first optical fiber at its excitation end, and a beam of parallel rays obtained by having a beam from said excitation port collimated being passed through said second double refraction element, said first magnetooptic element, and said first double refraction element in order of mention, and, when the beam is converge by said second lens to form a focus, the focus is positioned inside the core of said first optical fiber at its excitation end;

a second magnetooptic element for rotating the plane of polarization of transmitting light therethrough by an angle of 45°; and a third wedge plate made of a double refraction material and having its optical axis in a position to be reached by the optical axis of said second wedge plate when said third wedge late is rotated 45° round said optical path in the same direction as the rotating direction of the plane of polarization in said second magnetooptic element, said second magnetooptic element and said third wedge plate being disposed between said second wedge plate and said second lens in order of mention;

said first, second, and third wedge plates being disposed such that a top and a bottom of said first wedge plate oppose a bottom and a top of said second wedge plate, respectively, the top and the bottom of said second wedge plate oppose a bottom and a top of said third wedge plate (62), respectively, and the wedge angle of said second wedge plate being virtually equal to the sum of the wedge angel of said first wedge plate and the wedge angle of said third wedge plate.

3. An optical device for optically connecting a first optical fiber and a second optical fiber with an optical path provided between said first and second optical fibers comprising:

a first lens and a second lens disposed in said optical path for collimating light beams emitted from excitation ends of said first and second optical fibers, respectively, into a beam of virtually parallel rays;

a first double refraction element and a second double refraction element, disposed between said first and second lenses, each having an optical axis in a predetermined relationship with said optical path;

a first magnetooptic element disposed between said first and second double refraction elements for rotating the plane of polarization of transmitted light therethrough by an angle of 45°; and an excitation port disposed in a predetermined position in the vicinity of the excitation end of said second optical fiber for emitting at least a linearly polarized light beam corresponding to either of the ordinary ray and the extraordinary ray in said second double refraction element, a beam of parallel rays obtained by having a light beam from the excitation end of said first optical fiber collimated by said first lens being passed through said first double refraction element, said first magnetooptic element, and said second double refraction element in order of mention, and, when the beam is converged by said second lens to form a focus, the focus is positioned inside the core of said second optical fiber at its excitation end, a beam of parallel rays obtained by having a beam from the excitation end of said second optical fiber collimated by said second lens being passed through said second double refraction element, said first magnetooptic element, and said first double refraction element in order of mention, and, when the beam is converged by said first lens to form a focus, the focus is positioned outside the core of said first optical fiber at its excitation end, a beam of parallel rays obtained by having a beam from said excitation port collimated being passed through said second double refraction element, said first magnetooptic element, and said first double refraction element in order of mention, and, when the beam is converged by said second lens to form a focus, the focus is positioned inside the core of said first optical fiber at its excitation end, said excitation port including two excitation ports, and light beams from said two excitation ports corresponding to the ordinary and the extraordinary ray in said second double refraction element, respectively.

4. An optical device according to claim 3, wherein said two excitation ports are excitation ends of a first and a second polarization maintaining fiber on the other sides of excitation ends of the same connected with light sources, respectively.

5. An optical device according to claim 4, wherein said first and second polarization maintaining fibers are disposed parallel to each other,
said second optical fiber is disposed between said first and second polarization maintaining fibers, and
linearly polarized light beams emitted from the excitation ends of said first and second polarization maintaining fibers are collimated by said second lens.

6. An optical device according to claim 4, wherein said first and second polarization maintaining fibers are at an angle with said second optical fiber, said optical device further comprising
a third and a fourth lens for collimating linearly polarized light beams emitted from the excitation ends of said first and second polarization maintaining fibers, respectively.

7. An optical device according to claim 4, further comprising:
a third and a fourth lens for collimating linearly polarized light beams emitted from the excitation ends of said first and second polarization maintaining fibers, respectively; and
a first and a second mirror for reflecting beams of parallel rays obtained through collimation by said third and fourth lenses, respectively.

8. An optical device according to claim 3, wherein said two excitation ports comprise a first and a second laser diode, said optical device further comprising
a third and a fourth lens for collimating linearly polarized light beams emitted from said first and second laser diodes.

9. An optical device for optically connecting a first optical fiber and a second optical fiber with an optical path provided between said first and second optical fibers comprising:
a first lens and a second lens disposed in said optical path for collimating light beams emitted from excitation ends of said first and second optical fibers, respectively, into a beam of virtually parallel rays;
a first double refraction element and a second double refraction element, disposed between said first and second lenses, each having an optical axis in a predetermined relationship with said optical path;
a first magnetooptic element disposed between said first and second double refraction elements for rotating the plane of polarization of transmitted light therethrough by an angle of 45°; and
an excitation port disposed in a predetermined position in the vicinity of the excitation end of said second optical fiber for emitting at least a linearly polarized light beam corresponding to either of the ordinary ray and the extraordinary ray in said second double refraction element,
a beam of parallel rays obtained by having a light beam from the excitation end of said first optical fiber collimated by said first lens being passed through said first double refraction element, said first magnetooptic element, and said second double refraction element in order of mention, and, when the beam is converged by said second lens to form a focus, the focus is positioned inside the core of said second optical fiber at its excitation end,
a beam of parallel rays obtained by having a beam from the excitation end of said second optical fiber collimated by said second lens being passed through said second double refraction element, said first magnetooptic element, and said first double refraction element in order of mention, and, when the beam is converged by said first lens to form a focus, the focus is positioned outside the core of said first optical fiber at its excitation end,
a beam of parallel rays obtained by having a beam from said excitation port collimated being passed through said second double refraction element, said first magnetooptic element, and said first double refraction element in order of mention, and, when the beam is converged by said second lens to form a focus, the focus is positioned inside the core of said first optical fiber at its excitation end, and
said first and second double refraction elements and said first magnetooptic element being fixed on a table rotatable around an axis virtually perpendicular to said optical path.

* * * * *

UNITED STATES PATENT AND TRADEMARK OFFICE
CERTIFICATE OF CORRECTION

PATENT NO. : 5,402,509

DATED : March 28, 1995

INVENTOR(S) : Fukushima

It is certified that error appears in the above-identified patent and that said Letters Patent is hereby corrected as shown below:

Title Page, [21], "50,143" should be --050,143--.

Col. 5, line 16, "On" should be --On--.

Col. 6, line 15, ""].01" should be --101--.

Col. 9, line 51, "2" should be --2.--.

Col. 14, line 61, after "ordinary" insert --ray--.

Signed and Sealed this

Eleventh Day of August 1998

Attest:

BRUCE LEHMAN

*Attesting Officer*     *Commissioner of Patents and Trademarks*